(12) United States Patent
Salter et al.

(10) Patent No.: US 10,137,831 B1
(45) Date of Patent: Nov. 27, 2018

(54) VEHICLE SEAL ASSEMBLY

(71) Applicant: Ford Global Technologies, LLC, Dearborn, MI (US)

(72) Inventors: Stuart C. Salter, White Lake, MI (US); Paul Kenneth Dellock, Northville, MI (US); Chester Stanislaus Walawender, Livonia, MI (US); David Brian Glickman, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 2 days.

(21) Appl. No.: 15/653,736

(22) Filed: Jul. 19, 2017

(51) Int. Cl.
| | | |
|---|---|---|
| *B60Q 1/00* | (2006.01) |
| *B60Q 3/50* | (2017.01) |
| *B60Q 3/78* | (2017.01) |
| *B60Q 3/62* | (2017.01) |
| *H05B 33/22* | (2006.01) |
| *G09F 13/20* | (2006.01) |
| *G09F 13/22* | (2006.01) |

(52) U.S. Cl.
CPC ............... *B60Q 3/50* (2017.02); *B60Q 3/62* (2017.02); *B60Q 3/78* (2017.02); *G09F 13/20* (2013.01); *H05B 33/22* (2013.01); *G09F 2013/227* (2013.01)

(58) Field of Classification Search
CPC ... B60Q 3/50; B60Q 3/62; B60Q 3/78; H05B 33/22; G09F 13/20; G09F 2013/227
See application file for complete search history.

(56) References Cited

U.S. PATENT DOCUMENTS

| | | |
|---|---|---|
| 2,486,859 A | 11/1949 | Meijer et al. |
| 5,053,930 A | 10/1991 | Benavides |
| 5,434,013 A | 7/1995 | Fernandez |
| 5,709,453 A | 1/1998 | Krent et al. |
| 5,839,718 A | 11/1998 | Hase et al. |
| 6,031,511 A | 2/2000 | DeLuca et al. |
| 6,117,362 A | 9/2000 | Yen et al. |
| 6,294,990 B1 | 9/2001 | Knoll et al. |
| 6,419,854 B1 | 7/2002 | Yocom et al. |
| 6,494,490 B1 | 12/2002 | Trantoul |
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |

(Continued)

FOREIGN PATENT DOCUMENTS

| | | |
|---|---|---|
| CN | 101337492 A | 1/2009 |
| CN | 201169230 Y | 2/2009 |

(Continued)

*Primary Examiner* — Ali Alavi
(74) *Attorney, Agent, or Firm* — Jason Rogers; Price Heneveld LLP

(57) ABSTRACT

An illuminated seal assembly is provided herein. The illuminated seal assembly includes a carrier that is configured to attach to a vehicle. The carrier has a first region and a second region having varied light transmissivities. A first light source is disposed on the carrier. A light guide is operably coupled with the first light source.

20 Claims, 7 Drawing Sheets

(56) References Cited

U.S. PATENT DOCUMENTS

| | | |
|---|---|---|
| 6,990,922 B2 | 1/2006 | Ichikawa et al. |
| 7,015,893 B2 | 3/2006 | Li et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,249,869 B2 | 7/2007 | Takahashi et al. |
| 7,264,366 B2 | 9/2007 | Hulse |
| 7,264,367 B2 | 9/2007 | Hulse |
| 7,347,576 B2 | 3/2008 | Wang et al. |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,726,856 B2 | 6/2010 | Tsutsumi |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,118,441 B2 | 2/2012 | Hessling |
| 8,120,236 B2 | 2/2012 | Auday et al. |
| 8,136,425 B2 | 3/2012 | Bostick |
| 8,163,201 B2 | 4/2012 | Agrawal et al. |
| 8,169,131 B2 | 5/2012 | Murazaki et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,261,686 B2 | 9/2012 | Birman et al. |
| 8,286,378 B2 | 10/2012 | Martin et al. |
| 8,317,329 B2 | 11/2012 | Seder et al. |
| 8,317,359 B2 | 11/2012 | Harbers et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,459,832 B2 | 6/2013 | Kim |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,539,702 B2 | 9/2013 | Li et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,653,553 B2 | 2/2014 | Yamazaki et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,894,256 B2 | 11/2014 | Gold |
| 8,905,610 B2 | 12/2014 | Coleman et al. |
| 8,952,341 B2 | 2/2015 | Kingsley et al. |
| 8,994,495 B2 | 3/2015 | Dassanayake et al. |
| 9,000,671 B2 | 4/2015 | Larsson |
| 9,006,751 B2 | 4/2015 | Kleo et al. |
| 9,018,833 B2 | 4/2015 | Lowenthan et al. |
| 9,057,021 B2 | 6/2015 | Kingsley et al. |
| 9,059,378 B2 | 6/2015 | Verger et al. |
| 9,065,447 B2 | 6/2015 | Buttolo et al. |
| 9,067,530 B2 | 6/2015 | Bayersdorfer et al. |
| 9,175,820 B2 | 11/2015 | Grote, III et al. |
| 9,187,034 B2 | 11/2015 | Tarahomi et al. |
| 9,299,887 B2 | 3/2016 | Lowenthal et al. |
| 9,315,148 B2 | 4/2016 | Schwenke et al. |
| 9,452,709 B2 | 9/2016 | Aburto Crespo |
| 9,568,659 B2 | 2/2017 | Verger et al. |
| 9,616,812 B2 | 4/2017 | Sawayanagi |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2005/0084229 A1 | 4/2005 | Babbitt et al. |
| 2005/0189795 A1 | 9/2005 | Roessler |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2007/0297045 A1 | 12/2007 | Sakai et al. |
| 2008/0205075 A1 | 8/2008 | Hikmet et al. |
| 2009/0217970 A1 | 9/2009 | Zimmerman et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2010/0102736 A1 | 4/2010 | Hessling |
| 2011/0012062 A1 | 1/2011 | Agrawal et al. |
| 2011/0265360 A1 | 11/2011 | Podd et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0050979 A1 | 2/2013 | Van De Ven et al. |
| 2013/0092965 A1 | 4/2013 | Kijima et al. |
| 2013/0335994 A1 | 12/2013 | Mulder et al. |
| 2014/0003044 A1 | 1/2014 | Harbers et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0211498 A1* | 7/2014 | Cannon .............. B60Q 3/54 362/555 |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0085488 A1 | 3/2015 | Grote, III et al. |
| 2015/0109602 A1 | 4/2015 | Martin et al. |
| 2015/0138789 A1 | 5/2015 | Singer et al. |
| 2015/0267881 A1 | 9/2015 | Salter et al. |
| 2015/0307033 A1 | 10/2015 | Preisler et al. |
| 2016/0016506 A1 | 1/2016 | Collins et al. |
| 2016/0102819 A1 | 4/2016 | Misawa et al. |
| 2016/0131327 A1 | 5/2016 | Moon et al. |
| 2016/0236613 A1 | 8/2016 | Trier |
| 2016/0240794 A1 | 8/2016 | Yamada et al. |
| 2017/0158125 A1* | 6/2017 | Schuett .............. B60J 7/0007 |
| 2017/0253179 A1 | 9/2017 | Kumada |

FOREIGN PATENT DOCUMENTS

| | | |
|---|---|---|
| CN | 201193011 Y | 2/2009 |
| CN | 204127823 U | 1/2015 |
| DE | 4120677 A1 | 1/1992 |
| DE | 29708699 U1 | 7/1997 |
| DE | 10319396 A1 | 11/2004 |
| DE | 102012017281 A1 | 3/2013 |
| DE | 102011119102 A1 | 5/2013 |
| DE | 102015012141 A1 | 5/2016 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014068440 A1 | 5/2014 |
| WO | 2014161927 A1 | 10/2014 |

* cited by examiner

US 10,137,831 B1

VEHICLE SEAL ASSEMBLY

FIELD OF THE INVENTION

The present disclosure generally relates to illuminated seal assemblies and, more particularly, to an illuminated seal assembly that may be disposed along a perimeter of a vehicle panel.

BACKGROUND OF THE INVENTION

Vehicle seal assemblies are typically configured as a sealing device that contacts multiple panels and/or substrates of a vehicle. It is desired to implement improved illuminated seal assemblies along the vehicle.

SUMMARY OF THE INVENTION

According to one aspect of the present disclosure, an illuminated seal assembly is disclosed. The illuminated seal assembly includes a carrier that is configured to attach to a vehicle. The carrier has a first region and a second region having varied light transmissivities. A first light source is disposed on the carrier. A light guide is operably coupled with the first light source. The seal assembly may be configured as a vehicle seal assembly.

According to another aspect of the present disclosure, a vehicle is disclosed. The vehicle includes a flange formed by a panel of the vehicle. A window is defined within the panel. An illuminated seal assembly is coupled with the flange. A light source configured to emit light in an outboard direction and an inboard direction from within the seal assembly.

According to yet another aspect of the present disclosure, an illuminated seal assembly for a vehicle is disclosed. The illuminated seal assembly includes a carrier having a first region and a second region having varied light transmissivities. The first region is inboard of the second region. A first light source is disposed on the carrier. A light guide is operably coupled with the first light source.

These and other aspects, objects, and features of the present invention will be understood and appreciated by those skilled in the art upon studying the following specification, claims, and appended drawings.

DETAILED DESCRIPTION OF THE PREFERRED EXAMPLES

Figure 2:
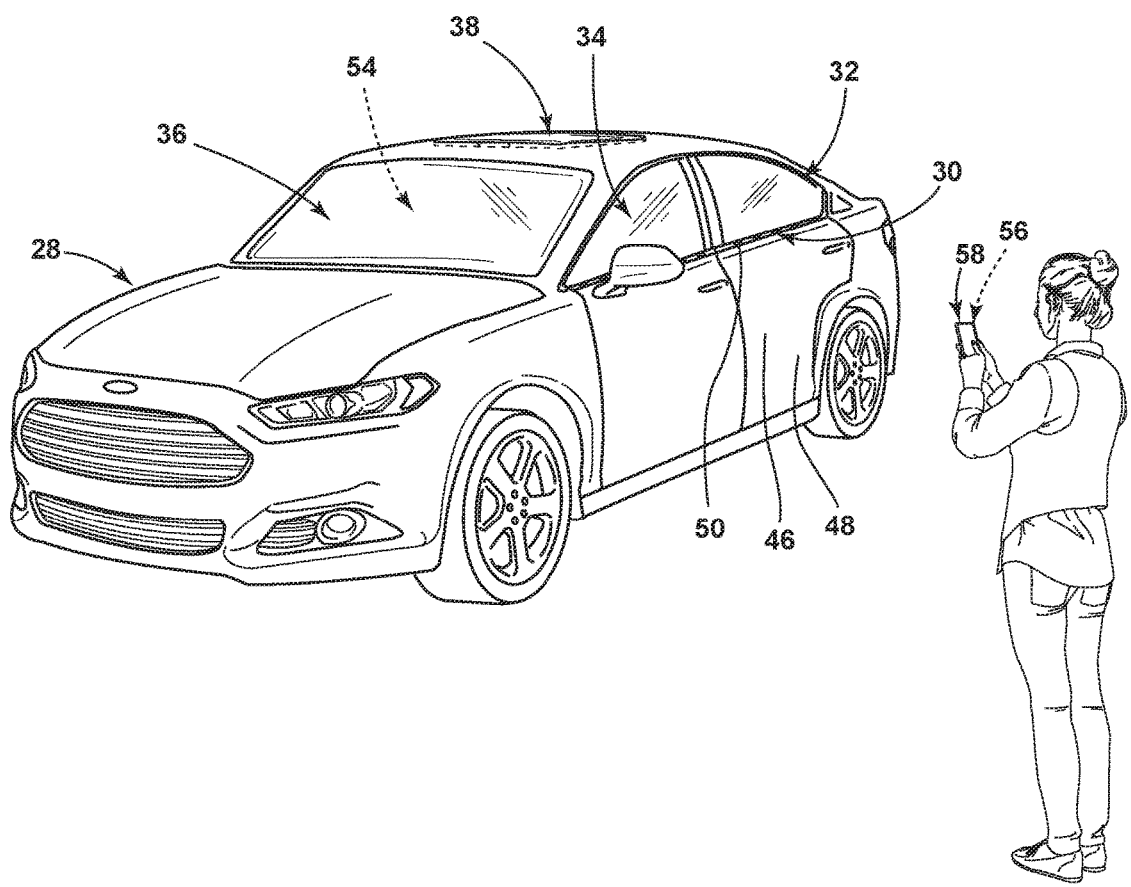
FIG. 2 is a front perspective view of a vehicle containing one or more illuminated window assemblies according to some examples.

For purposes of description herein, the terms "upper," "lower," "right," "left," "rear," "front," "vertical," "horizontal," and derivatives thereof shall relate to the invention as oriented in FIG. 2. However, it is to be understood that the invention may assume various alternative orientations, except where expressly specified to the contrary. It is also to be understood that the specific devices and processes illustrated in the attached drawings, and described in the following specification are simply exemplary examples of the inventive concepts defined in the appended claims. Hence, specific dimensions and other physical characteristics relating to the examples disclosed herein are not to be considered as limiting, unless the claims expressly state otherwise.

As required, detailed examples of the present invention are disclosed herein. However, it is to be understood that the disclosed examples are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes an illuminated seal assembly for a vehicle. The seal assembly may include one or more light sources therein. The illuminated seal assembly may further employ one or more phosphorescent and/or luminescent structures to luminesce in response to predefined events. The one or more luminescent structures may be configured to convert excitation light received from an associated light source and re-emit the light at a different wavelength generally found in the visible spectrum.

Figure 1A:
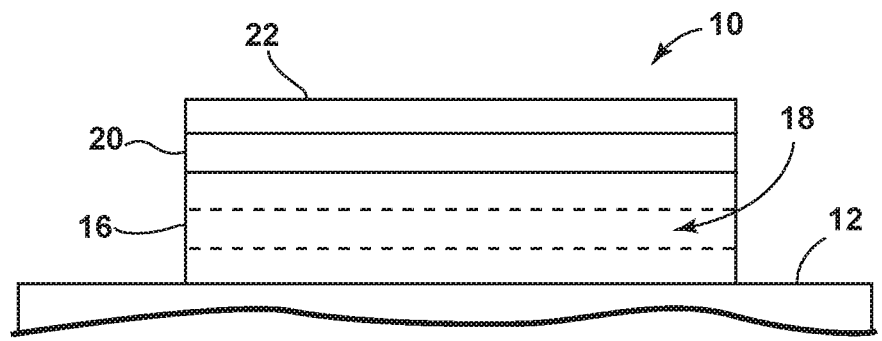
FIG. 1A is a side view of a luminescent structure rendered as a coating, according to some examples.
Figure 1B:
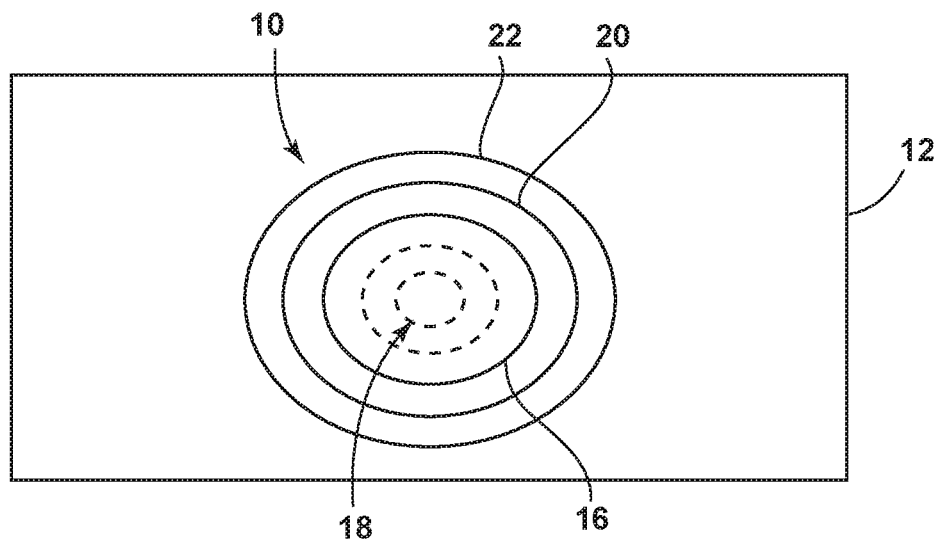
FIG. 1B is a top view of a luminescent structure rendered as a discrete particle, according to some examples.
Figure 1C:
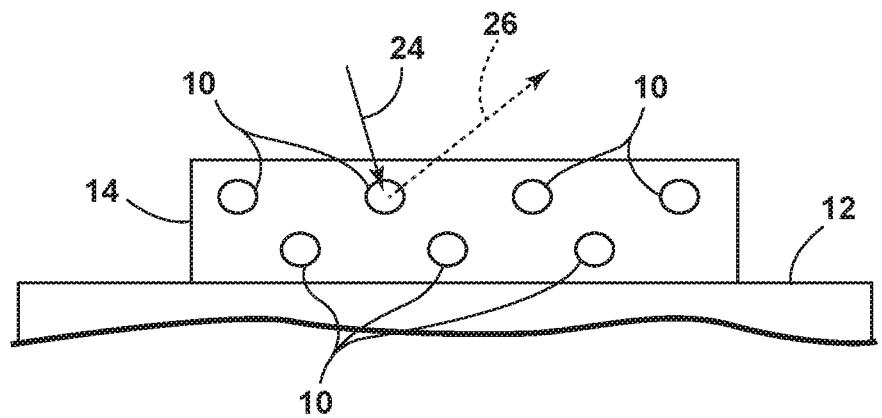
FIG. 1C is a side view of a plurality of luminescent structures rendered as discrete particles and incorporated into a separate structure.

Referring to FIGS. 1A-1C, various exemplary examples of luminescent structures 10 are shown, each capable of being coupled to a substrate 12, which may correspond to a vehicle fixture or vehicle-related piece of equipment. In FIG. 1A, the luminescent structure 10 is generally shown rendered as a coating (e.g., a film) that may be applied to a surface of the substrate 12. In FIG. 1B, the luminescent structure 10 is generally shown as a discrete particle capable of being integrated with a substrate 12. In FIG. 1C, the luminescent structure 10 is generally shown as a plurality of discrete particles that may be incorporated into a support medium 14 (e.g., a film) that may then be applied (as shown) or integrated with the substrate 12.

At the most basic level, a given luminescent structure 10 includes an energy conversion layer 16 that may include one or more sublayers, which are exemplarily shown in broken lines in FIGS. 1A and 1B. Each sublayer of the energy conversion layer 16 may include one or more luminescent materials 18 having energy converting elements with phosphorescent or fluorescent properties. Each luminescent material 18 may become excited upon receiving an excitation light 24 of a specific wavelength, thereby causing the light to undergo a conversion process. Under the principle of down conversion, the excitation light 24 is converted into a longer-wavelength, converted light 26 that is outputted from the luminescent structure 10. Conversely, under the principle of up conversion, the excitation light 24 is converted into a shorter wavelength light that is outputted from the luminescent structure 10. When multiple distinct wavelengths of light are outputted from the luminescent structure 10 at the same time, the wavelengths of light may mix together and be expressed as a multicolor light.

Light emitted by one or more light sources 40 (FIG. 4) may be referred to herein as excitation light 24 and is illustrated herein as solid arrows. In contrast, light emitted from the luminescent structure 10 may be referred to herein as converted light 26, or luminescence, and may be illustrated herein as broken arrows.

The energy conversion layer 16 may be prepared by dispersing the luminescent material 18 in a polymer matrix to form a homogenous mixture using a variety of methods. Such methods may include preparing the energy conversion layer 16 from a formulation in a liquid carrier support medium 14 and coating the energy conversion layer 16 to a desired substrate 12. The energy conversion layer 16 may be applied to a substrate 12 by painting, screen-printing, spraying, slot coating, dip coating, roller coating, and bar coating. Alternatively, the energy conversion layer 16 may be prepared by methods that do not use a liquid carrier support medium 14. For example, the energy conversion layer 16 may be rendered by dispersing the luminescent material 18 into a solid-state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate 12 using any methods known to those skilled in the art. When the energy conversion layer 16 includes sublayers, each sublayer may be sequentially coated to form the energy conversion layer 16. Alternatively, the sublayers can be separately prepared and later laminated or embossed together to form the energy conversion layer 16. Alternatively still, the energy conversion layer 16 may be formed by coextruding the sublayers.

In various examples, the converted light 26 that has been down converted or up converted may be used to excite other luminescent material(s) 18 found in the energy conversion layer 16. The process of using the converted light 26 outputted from one luminescent material 18 to excite another, and so on, is generally known as an energy cascade and may serve as an alternative for achieving various color expressions. With respect to either conversion principle, the difference in wavelength between the excitation light 24 and the converted light 26 is known as the Stokes shift and serves as the principal driving mechanism for an energy conversion process corresponding to a change in wavelength of light. In the various examples discussed herein, each of the luminescent structures 10 may operate under either conversion principle.

Referring back to FIGS. 1A and 1B, the luminescent structure 10 may optionally include at least one stability layer 20 to protect the luminescent material 18 contained within the energy conversion layer 16 from photolytic and thermal degradation. The stability layer 20 may be configured as a separate layer optically coupled and adhered to the energy conversion layer 16. Alternatively, the stability layer 20 may be integrated with the energy conversion layer 16. The luminescent structure 10 may also optionally include a protective layer 22 optically coupled and adhered to the stability layer 20 or other layer (e.g., the conversion layer 16 in the absence of the stability layer 20) to protect the luminescent structure 10 from physical and chemical damage arising from environmental exposure. The stability layer 20 and/or the protective layer 22 may be combined with the energy conversion layer 16 through sequential coating or printing of each layer, sequential lamination or embossing, or any other suitable means.

According to various examples, the luminescent material 18 may include organic or inorganic fluorescent dyes including rylenes, xanthenes, porphyrins, and phthalocyanines. Additionally, or alternatively, the luminescent material 18 may include phosphors from the group of Ce-doped garnets such as YAG:Ce and may be a short-persistence luminescent material 18. For example, an emission by $Ce^{3+}$ is based on an electronic energy transition from $4D^1$ to $4f^1$ as a parity allowed transition. As a result of this, a difference in energy between the light absorption and the light emission by $Ce^{3+}$ is small, and the luminescent level of $Ce^{3+}$ has an ultra-short lifespan, or decay time, of $10^{-8}$ to $10^{-7}$ seconds (10 to 100 nanoseconds). The decay time may be defined as the time between the end of excitation from the excitation light 24 and the moment when the light intensity of the converted light 26 emitted from the luminescent structure 10 drops below a minimum visibility of 0.32 mcd/m$^2$. A visibility of 0.32 mcd/m$^2$ is roughly 100 times the sensitivity of the dark-adapted human eye, which corresponds to a base level of illumination commonly used by persons of ordinary skill in the art.

According to various examples, a $Ce^{3+}$ garnet may be utilized, which has a peak excitation spectrum that may reside in a shorter wavelength range than that of conventional YAG:Ce-type phosphors. Accordingly, $Ce^{3+}$ has short-persistence characteristics such that its decay time may be 100 milliseconds or less. Therefore, in various examples, the rare earth aluminum garnet type Ce phosphor may serve as the luminescent material 18 with ultra-short-persistence characteristics, which can emit the converted light 26 by absorbing purple to blue excitation light 24 emitted from the one or more light sources 40. According to various examples, a ZnS:Ag phosphor may be used to create a blue-converted light 26. A ZnS:Cu phosphor may be utilized to create a yellowish-green converted light 26. A $Y_2O_2S$:Eu phosphor may be used to create red converted light 26. Moreover, the aforementioned phosphorescent materials may be combined to form a wide range of colors, including white light. It will be understood that any short-persistence luminescent material known in the art may be utilized without departing from the teachings provided herein.

Additionally, or alternatively, the luminescent material 18, according to various examples, disposed within the luminescent structure 10 may include a long-persistence luminescent material 18 that emits the converted light 26, once charged by the excitation light 24. The excitation light 24 may be emitted from any excitation source (e.g., any natural light source, such as the sun, and/or any artificial light source). The long-persistence luminescent material 18 may be defined as having a long decay time due to its ability to store the excitation light 24 and release the converted light 26 gradually, for a period of several minutes or hours, once the excitation light 24 is no longer present.

The long-persistence luminescent material 18, according to various examples, may be operable to emit light at or above an intensity of 0.32 $mcd/m^2$ after a period of 10 minutes. Additionally, the long-persistence luminescent material 18 may be operable to emit light above or at an intensity of 0.32 $mcd/m^2$ after a period of 30 minutes and, in various examples, for a period substantially longer than 60 minutes (e.g., the period may extend 24 hours or longer, and in some instances, the period may extend 48 hours). Accordingly, the long-persistence luminescent material 18 may continually illuminate in response to excitation from any one or more light sources 40 that emit the excitation light 24, including, but not limited to, natural light sources (e.g., the sun) and/or any artificial one or more light sources 40. The periodic absorption of the excitation light 24 from any excitation source may provide for a substantially sustained charge of the long-persistence luminescent material 18 to provide for consistent passive illumination. In various examples, a light sensor may monitor the illumination intensity of the luminescent structure 10 and actuate an excitation source when the illumination intensity falls below 0.32 $mcd/m^2$, or any other predefined intensity level.

The long-persistence luminescent material 18 may correspond to alkaline earth aluminates and silicates, for example, doped di-silicates, or any other compound that is capable of emitting light for a period of time once the excitation light 24 is no longer present. The long-persistence luminescent material 18 may be doped with one or more ions, which may correspond to rare earth elements, for example, $Eu^{2+}$, $Tb^{3+}$, and/or $Dy3$. According to one non-limiting exemplary examples, the luminescent structure 10 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The luminescent structure 10, according to various examples, may be a translucent white color, and in some instances reflective, when unilluminated. Once the luminescent structure 10 receives the excitation light 24 of a particular wavelength, the luminescent structure 10 may emit any color light (e.g., blue or red) therefrom at any desired brightness. According to various examples, a blue emitting phosphorescent material may have the structure $Li_2ZnGeO_4$ and may be prepared by a high-temperature solid-state reaction method or through any other practicable method and/or process. The afterglow may last for a duration of 2-8 hours and may originate from the excitation light 24 and d-d transitions of $Mn2+$ ions.

According to an alternate non-limiting exemplary example, 100 parts of a commercial solvent-borne polyurethane, such as Mace resin 107-268, having 50% solids polyurethane in toluene/isopropanol, 125 parts of a blue-green long-persistence phosphor, such as Performance Indicator PI-BG20, and 12.5 parts of a dye solution containing 0.1% Lumogen Yellow F083 in dioxolane may be blended to yield a low rare earth mineral luminescent structure 10. It will be understood that the compositions provided herein are non-limiting examples. Thus, any phosphor known in the art may be utilized within the luminescent structure 10 without departing from the teachings provided herein. Moreover, it is contemplated that any long-persistence phosphor known in the art may also be utilized without departing from the teachings provided herein.

Figure 3:
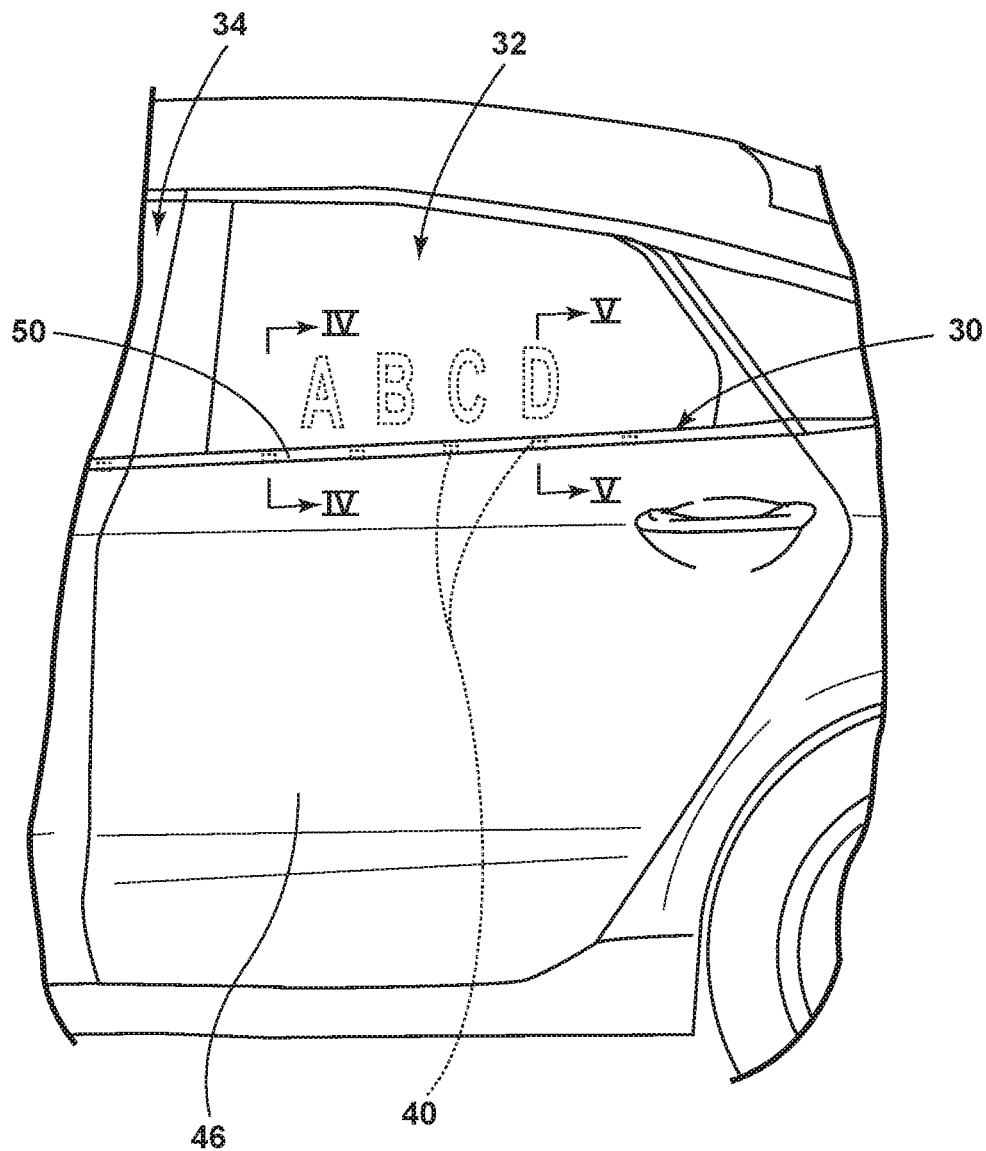
FIG. 3 is a front perspective view of a rear door of the vehicle, according to some examples.

Referring to FIGS. 2 and 3, a vehicle 28 is depicted with an illuminated seal assembly 30 integrated along a belt line of the vehicle 28 below a front window 34 and/or a rear passenger window 32. However, it will be appreciated that the illuminated seal assembly 30 provided herein may be disposed in any portion of the vehicle 28. For example, the illuminated seal assembly 30 may be disposed along a windshield 36, a moon roof 38, a rear window, any other movable and/or light transmissive substrate within the vehicle 28, etc. When the illuminated seal assembly 30 is activated, a light pattern is transmitted outwardly from the vehicle 28 from one or more light sources 40 from a portion of the illuminated seal assembly 30. Additionally, or alternatively, the illumination may be transmitted through a window of the vehicle 28. Some luminescent structure 24 from the one or more light sources 40 may also enter the interior of the vehicle 28 and may be used for any purpose. For example, the light within the vehicle 28 may be utilized as a dome light. In some aspects, the illumination produced by the illuminated seal assembly 30 can also function to provide an interesting lighting aesthetic (e.g., mood lighting) for the vehicle 28.

With further reference to FIGS. 2 and 3, the vehicle 28 includes one or more doors 46 that has an outer panel 48 to which a trim member 50 and illuminated seal assembly 30 may be attached. In some examples, the trim member 50 and the illuminated seal assembly 30 may be individual components. In other examples, the trim member 50 and the illuminated seal assembly 30 may be configured as a common integrated component. The door 46 may also include a window 32, 34. The illuminated seal assembly 30 is mounted to outer panel 48 so as to sealingly engage both the window 32, 34 and the trim member 50, as well as other trim interfaces. The illuminated seal assembly 30 may be provided for sealing an exterior surface 52 (FIG. 4) of the window 32, 34. The illuminated seal assembly 30 also may reduce unwanted NVH (noise, vibration, and harshness) within a passenger compartment 54 of the vehicle 28.

Referring still to FIGS. 2 and 3, the vehicle 28 may be utilized for personal and/or commercial purposes, such as for ride-providing (chauffeuring) services and/or ride-sharing services. An application 58 associated with the commercial purpose of the vehicle 28 may be installed on a user's electronic device 56. The application 58 may be configured to communicate with the vehicle 28 (either directly and/or through a remote station) and/or a vehicle associated electronic device 56 that may be disposed within the vehicle 28 and/or remotely disposed. Through the communication between the user's electronic device 56 and the vehicle associated electronic device 56, a commercial relationship may be established in which the vehicle 28 is used to facilitate a service.

The user's electronic device 56 and the vehicle associated electronic device 56 may be any one of a variety of computing devices and may include a processor and memory. For example, the user's electronic device 56 and the vehicle associated electronic device 56 may be a cell phone, mobile communication device, a key fob, wearable device (e.g., fitness band, watch, glasses, jewelry, wallet), apparel (e.g., a tee shirt, gloves, shoes or other accessories), personal digital assistant, headphones and/or other devices that include capabilities for wireless communications using IEEE 2.11, Bluetooth, and/or any other wired or wireless communications protocols. Further, the vehicle associated electronic device 56 may be a computer or any other electronic device that is disposed within the vehicle 28.

In various examples, the vehicle 28 and/or the vehicle associated electronic device 56 may communicate with the user's electronic device 56 through a wireless network. Accordingly, the network may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 2.11, etc.), local area networks (LAN), and/or wide area networks (WAN), including the Internet, providing data communication services.

Moreover, the vehicle 28 and/or the vehicle associated electronic device 56 may include a wireless transceiver (e.g., a BLUETOOTH module, a ZIGBEE transceiver, a Wi-Fi transceiver, an IrDA transceiver, a RFID transceiver, etc.) configured to communicate with a compatible wireless transceiver of the user's electronic device 56. Additionally or alternately, the vehicle 28 and/or the vehicle associated electronic device 56 may communicate with the user's electronic device 56 over a wired connection, such as via a USB connection.

The application 58 may be configured to utilize a device link interface to interact with the vehicle 28 and/or the vehicle associated electronic device 56. When connected to the vehicle 28, the application 58 may be configured to utilize information from vehicle sensors, actuators, and electronic control units. The application 58 may also be configured to operate when untethered from the vehicle 28, such as when the user is riding public transportation or walking. The application 58 may be further configured to communicate with servers via a communications network. The user may interact with the application 58 through the HMI of the vehicle associated electronic device 56, via a web interface, or via the HMI of the vehicle 28.

The vehicle 28 may be a manually operated vehicle (i.e. using a human driver) or may be autonomously driven by an onboard computer. Additionally, or alternatively, the vehicle 28 may be remotely controlled (e.g., via an operator located in a different location). In autonomous examples, one of which is exemplarily illustrated in FIG. 3, the computer may be configured for communicating with one or more remote sites such as a server via a network. The one or more remote sites may include a data store. The vehicle 28, including the computer, is configured to receive information, e.g., collected data, from the one or more data collectors related to various components of the vehicle 28, e.g., a steering wheel, brake pedal, accelerator pedal, gearshift lever, etc. The computer generally includes an autonomous driving module that includes instructions for autonomously, i.e., without some, or any, operator input, operating the vehicle 28, including possibly in response to instructions received from the server. Further, the computer, e.g., in the module, generally includes instructions for receiving data, e.g., from one or more data collectors and/or a human machine interface (HMI), such as an interactive voice response (IVR) system, a graphical user interface (GUI) including a touchscreen or the like, etc.

The application 58 on the electronic device 56 may also be configured to alter lighting characteristics of the illuminated seal assembly 30. For example, a user may alter the color of luminescent structure 24 emitted from the one or more light sources 40, alter the intensity of light emitted from the one or more light sources 40, and/or set parameters for activation of the one or more light sources 40. For example, the user may set the illuminated assembly to illuminate in a first color (e.g., red) when the vehicle 28 is exited and left in an unlocked state and illuminate in a second color (e.g., green) when the vehicle 28 is exited and placed in a locked state.

Figure 4:
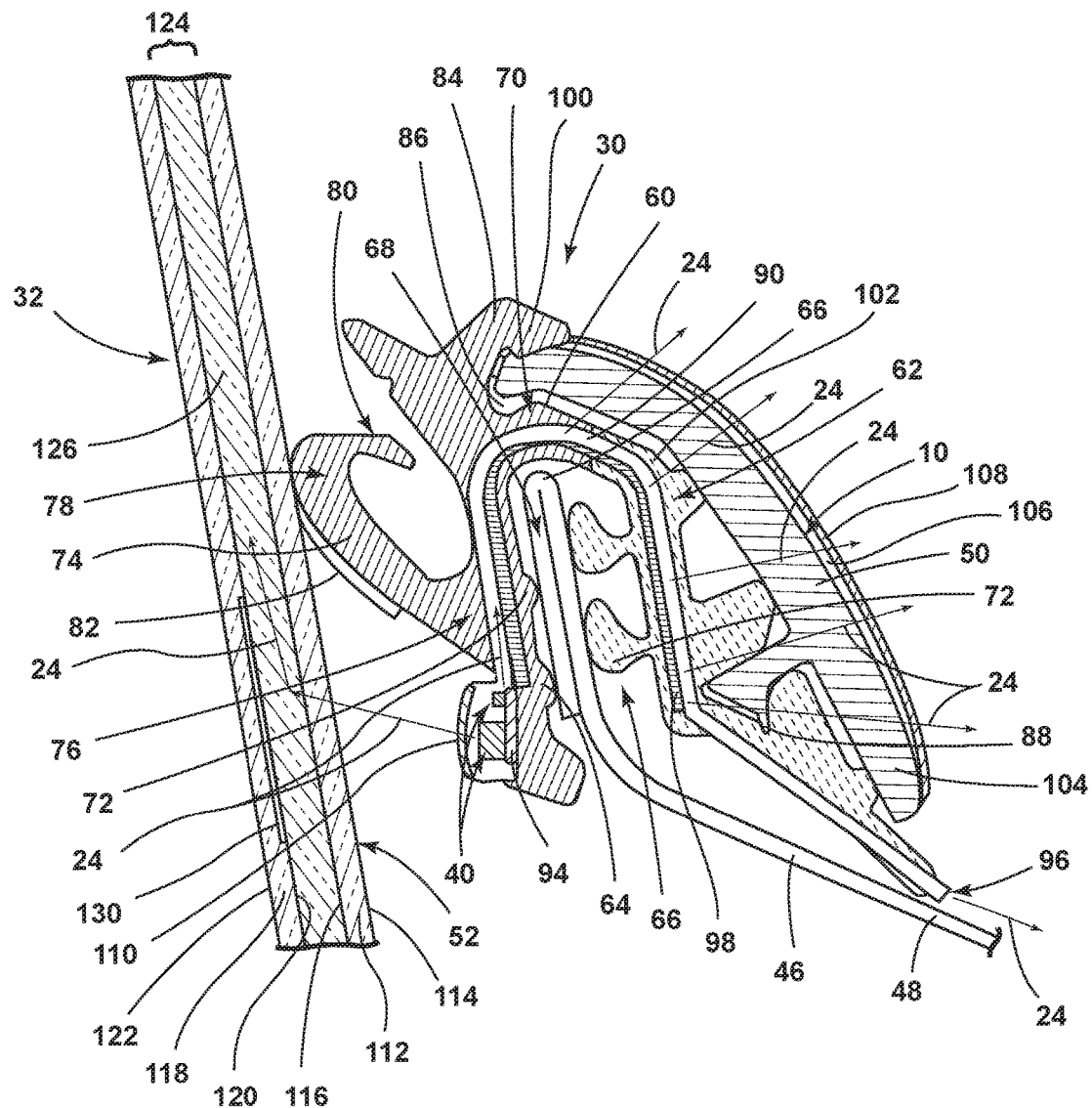
FIG. 4 is a cross-sectional view of the illuminated seal assembly taken along the line IV-IV of FIG. 3 illustrating the illuminated seal assembly, according to some examples.
Figure 5:
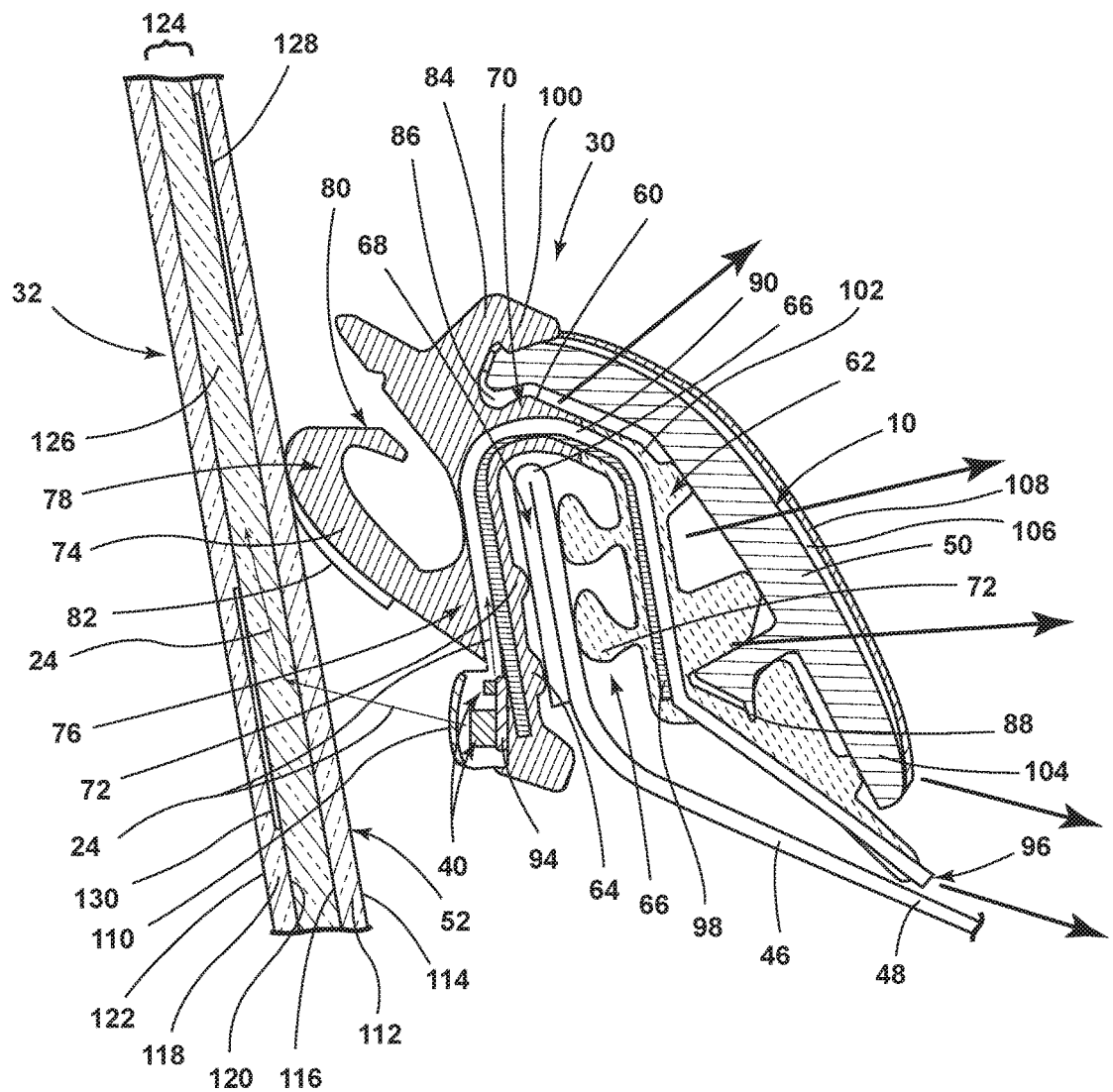
FIG. 5 is a cross-sectional view of the illuminated seal assembly taken along the line V-V of FIG. 3 illustrating the illuminated seal assembly, according to some examples.
Figure 6:
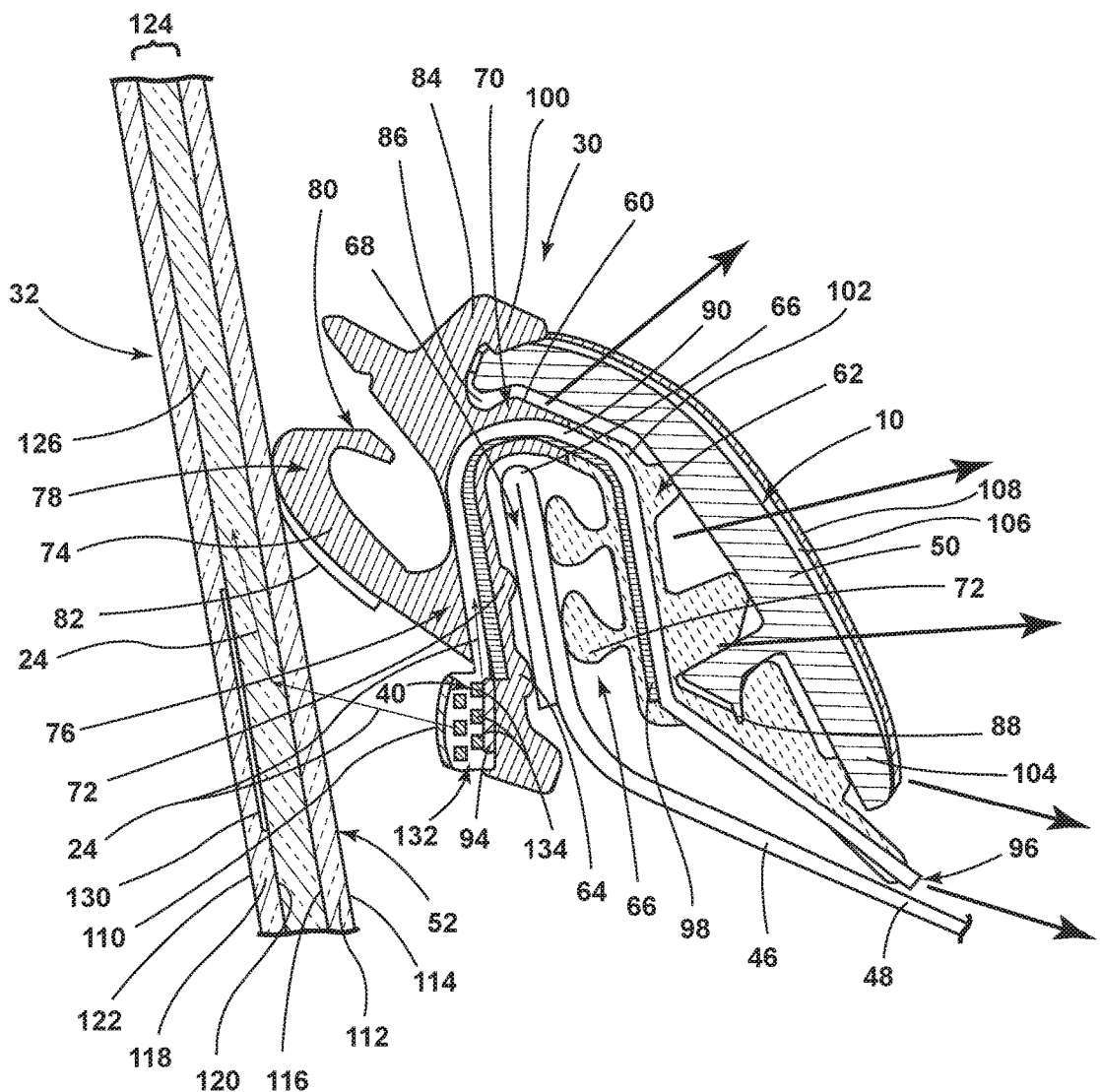
FIG. 6 is a cross-sectional view of the illuminated seal assembly taken along the line IV-IV of FIG. 3 illustrating the illuminated seal assembly, according to some examples.

Referring to FIGS. 4-6, the illuminated seal assembly 30 is mounted upon the outer panel 48. In the example depicted in FIG. 4, the illuminated seal assembly 30 has an elongated carrier 60 having a substantially U-shaped cross section and a plurality of features extending therefrom. The carrier 60 has an exterior lateral wall portion 62 and an interior lateral wall portion 64 that are arranged on opposing sides of a flange 68 of the door 46, and a connection portion 70 that connects upper portions of the exterior and interior lateral wall portions 62, 64. It will be appreciated that the carrier 60 may have any practicable cross-sectional shape without departing from the scope of the present disclosure.

Referring still to FIGS. 4-6, the trim member 50 is attached to the flange 68 by inserting the flange 68 into the carrier 60. Further, the trim member 50 is retained on the flange 68 by an engaging portion 66 that is formed by the exterior lateral wall portion 62 and the interior lateral wall portion 64. In some examples, the engaging portion 66 may include one or more protrusions 72. The carrier 60 may be made of materials that are moldable by extrusion molding, injection molding, or the like. For example, thermoplastic elastomers, resin, rubber, and specifically, an olefin-based thermoplastic elastomer (TPO), a styrene-based elastomer (TPS), polyvinyl chloride resin (PVC), polypropylene resin (PP), an ethylene propylene diene copolymer (EPDM), and/or any other practicable material may be used.

The carrier 60 of the illuminated seal assembly 30 includes a first leaf 74, which is cantilevered from the carrier 60. The first leaf 74 has a base portion 76 that is integrally coupled to the carrier 60 and a second, opposing abutment portion 78 that may include a hook portion 80. The hook portion 80 may assist in maintaining an upward orientation of the first leaf 74 as the window 32, 34 is moved between a first position and a second position, such as when the window 32, 34 is moved from a position substantially above the illuminated assembly (e.g., closed) to a position substantially, or partially, below the seal assembly 30 (e.g., open). The abutment portion 78 may contact a window 32, 34 of the vehicle 28 once the illuminated seal assembly 30 is disposed on the vehicle 28. Moreover, the abutment portion 78 may have a fiber layer 82 for reducing the sliding resistance between the window 32, 34 and the first leaf 74.

The fiber layer 82 is formed by numerous fibers being erected so that they may protrude substantially perpendicularly from the surface of the abutment portion 78. Additionally, the fibers may be made of any practicable material, including, but not limited to, a nylon-based resin and/or a polyester-based resin.

The carrier 60 also includes a second leaf 84 that may be disposed generally above the first leaf 74 and includes a resilient retaining portion 86. The retaining portion 86 may be configured to retain a portion of the trim member 50 therein. Likewise, the carrier 60 may include an attachment portion 88 for removably retaining the trim member 50.

A light guide 90 is disposed within the carrier 60 of the illuminated seal assembly 30. The light guide 90 may be elastically deformable for assistance in retaining the illuminated seal assembly 30 on the flange 68. The one or more light sources 40 may be disposed on a circuit board 94 that is operably, or optically, coupled with a light guide 90. Moreover, the one or more light sources 40 and/or circuit board 94 may be disposed within the light guide 90 to protect the one or more light sources 40 and the circuit board 94 from environmental containment. The light guide 90 may be configured to direct light through a vehicle outward portion 96 thereof, and along a portion of the vehicle door 46, and/or a portion of a ground surface disposed proximately to the vehicle 28. Additionally, and/or alternatively, the light guide 90, or light source, may be configured to direct light towards the window 32, 34.

In some examples, the one or more light sources 40 may be configured to emit visible and/or non-visible light, such as blue light, ultraviolet (UV) light, infrared light, and/or violet light and may include any form of light source. For example, fluorescent lighting, light-emitting diodes (LEDs), organic LEDs (OLEDs), polymer LEDs (PLEDs), laser diodes, quantum dot LEDs (QD-LEDs), solid-state lighting, a hybrid of these or any other similar device, and/or any other form of lighting may be utilized within the seal assembly 30. Further, various types of LEDs are suitable for use as the one or more light sources 40 including, but not limited to, top-emitting LEDs, side-emitting LEDs, and others.

With further reference to FIGS. 4-6, the light guide 90 is a substantially transparent or translucent guide suitable for transmitting light (e.g., excitation light 24) and is operably coupled with the one or more light sources 40. In some examples, the light guide 90 may be formed from a rigid material that is comprised of a curable substrate such as a polymerizable compound, a mold in clear (MIC) material or mixtures thereof. Acrylates are also used for forming rigid light pipes, as well as polymethyl methacrylate (PMMA), which is a known substitute for glass. A polycarbonate material may also be used in an injection molding process to form the rigid light guide 90. Further, in some examples, the light guide 90 may be a flexible light guide, wherein a suitable flexible material is used to create the light guide 90. Such flexible materials include urethanes, silicone, thermoplastic polyurethane (TPU), or other like optical grade flexible materials. Whether the light guide 90 is flexible or rigid, the light guide 90, when formed, is substantially optically transparent and/or translucent and capable of transmitting excitation light 24. The light guide 90 may be referred to as a light pipe, a light plate, a light bar or any other light carrying or transmitting substrate made from a clear or substantially translucent material.

A reflective material 98 may be disposed on portions of the light guide 90 to direct in a desired direction. The reflective material 98 may be an additional layer of material, such as light reflective paint, that is adhered to the desired portions of the light guide 90. For example, the reflective material 98 may be disposed on interior portions of the light guide 90. Accordingly, luminescent structure 24 emitted from the one or more light sources 40 is substantially prevented from illuminating upwardly of the first leaf 74 and/or leaking out from the engaging portion 66 of the carrier 60.

According to some examples, the carrier 60 may include a first region 100 and a second region 102. In some examples, the first region 100 is disposed inboard of the second region 102. The first and second regions 100, 102 may have varied light transmissivities when compared to one another. For example, the first region 100 may be less light transmissive than the second region 102. It will be appreciated, however, that the illuminated seal assembly 30 may include any number of regions having common and/or varied light transmissivities in any location without departing from the scope of the present disclosure. As used herein, the terms "inboard" and "outboard" are used to define a relationship to one another. Accordingly, any portion provided herein that is "inboard" is disposed in closer proximity to the passenger compartment 54 of the vehicle 28 when the illuminated seal assembly 30 is disposed on an exterior portion of the vehicle 28. For example, the one or more of the light sources 40 may be configured to emit light in an outboard direction, which may be away from a panel of the vehicle and/or an inboard direction, which may be towards the vehicle compartment 54.

The trim member 50 may confer any aesthetic appearance, such as a metallic pattern and may include a substrate 104 and a decorative layer 106 disposed on the substrate 104, and/or a protective layer 108. The decorative layer 106 may confer a variety of colors and/or metallic appearances, such as chrome, gold, aluminum, etc., with a plethora of possible textured finishes, such as a darkened or black appearance, etc. The protective layer 108 may be positioned over the decorative layer 106 and may protect the decorative layer 106 from damage and wear during use. The protective layer 108 may also protect the trim member 50 from the environmental contaminants, such as dirt and water that may come in contact with the vehicle 28. The protective layer 108 may be formed of any practicable transparent and/or translucent material known in the art and may absorb UV light, thereby preventing sunlight from exciting the luminescent structure 10 within the illuminated seal assembly 30 in some examples.

With further reference to FIGS. 4-6, the trim member 50 may be light transmissive such that light emitted from the one or more of the light sources 40 may be transmitted through the light guide 90 and through the trim member 50. In some examples, the trim member 50 may include a luminescent structure 10 within the decorative layer 106 that is configured to luminesce in response to receiving luminescent structure 24. The luminescent structure 24 may be generated by the one or more light sources 40 and/or by a natural light source. It will be appreciated that the substrate 104, the decorative layer 106, and the protective layer 108 may each be formed as independent components and/or any, or all, components may be formed as an integral component.

Referring still to FIGS. 4-6, the light guide 90 may further include one or more lenses 110 that may be formed in any manner to direct light in a desired direction. For example, the lens 110 may be configured as a Fresnel lens, a pillow optic, and/or any other type of lens or optic that is configured to disperse, concentrate, and/or otherwise direct light emitted from the one or more light sources 40 therethrough in any desired manner. In some examples, the lens 110 is configured to direct light towards the window 32, 34 of the vehicle 28.

With further reference to FIGS. 4-6, the rear window 32, which is shown in an enlarged view for illustrative purposes, includes a first or outer transparent and/or translucent panel 112. The outer panel 112 has a first side 114 or outer surface 52 and a second side 116 or inner surface. The window 32 may also include a second or inner transparent and/or translucent panel 118. The inner panel 118 has a third side 120 or outer surface and a fourth side 122 or inner surface. The outer panel 112 and inner panel 118 are spaced from each other by a gap 124 therebetween of a predetermined thickness. It will be appreciated that each component of the window 32 provided herein may be of any thickness without departing from the scope of the present disclosure.

A light-directing member 126 may be disposed within the gap 124 for accepting and transmitting the luminescent structure 24 through the window 32. In some aspects of the assembly 30, the light-directing member 126 is a film, coating, or layer deposited onto the outer panel 112 and/or inner panel 118. In other embodiments, the light-directing member 126 is a layer affixed to or spaced from the outer panel 112 and/or inner panel 118. In some embodiments, the light-directing member 126 is fabricated from an acrylic polymer material containing light-diffusing particles (e.g., ACRYLITE® LED acrylic sheet from Evonik Cryo LLC). In other aspects, the light-directing member 126 includes a matrix of substantially transparent polymeric, glass or glass-polymeric material containing light-diffusing particles. These particles can be of similar sizes, or dissimilar sizes, and at concentrations sufficient to scatter excitation light 24 from the one or more light sources 40 that is operably coupled to the light-directing member 126.

Referring to FIG. 5, the luminescent structure 10 may define one or more indicia 128. In operation, the luminescent structure 10, which may be disposed on and/or within the light-directing member 126 and/or the window 32, is formulated to become excited upon receiving excitation light 24 of a specific wavelength from the one or more light sources 40 that is directed through the light-directing member 126. As a result, the excitation light 24 undergoes an energy conversion process and is re-emitted at a different wavelength that may be transmitted through the window 32.

The luminescent structure 10 may be disposed on a first side of the light guide 90, such as the outboard facing side of the light guide 90. In some examples, the luminescent structure 10 may not be readily visible in a non-luminescent state. A wide range of luminescent materials 18 that luminesce in response to UV light, or any other wavelength of excitation light 24, may be substantially non-visible in an unexcited state, each of which may be utilized without departing from the scope of the present disclosure. Upon illumination of an associated one or more light sources 40, the luminescent material 18 may luminesce in the visible portion of the light spectrum. According to some examples, the luminescent structure 10 may include a mixture of UV light and infrared (IR) light excitable luminescent materials 18 therein that are capable of exciting the luminescent structure 10.

Optics 130 may be disposed within the window 32 and assist in directing excitation light 24 towards the luminescent structure 10. The optics 130 may be etched, molded, coupled to, or otherwise disposed on the light guide 90 such that additional light is directed towards the luminescent structure 10. The optics 130, according to some examples, are faintly etched onto the light guide 90 such that the optics 130 are not readily visible (i.e., easily noticeable at distances over two feet) to an onlooker. In some examples, a reflective material 98 may be utilized in conjunction with, or in lieu of, optics 130.

Referring to FIG. 6, the light-producing assembly 132 may include light sources 134 that may be printed and have largely coplanar electrodes. An example of light sources 134 that may be used with the technology described herein is described in U.S. Pat. No. 8,415,879 to Lowenthal et al., which is incorporated by reference herein. In various examples, individual light sources 134 (e.g., LEDs) may be disposed (e.g., printed, laminated, captured) on a substrate (e.g., a thin film having a thickness of less than 0.25 millimeters, a thin film having a thickness of 0.2 millimeters, a thin film having a thickness of 0.1 to 0.15 millimeters, a thin film having a thickness of 0.07 to 0.1 millimeters, a thin film having a thickness of 0.006 to 0.012 millimeters, a flexible thin film). In FIG. 6, discrete units appear to be illustrated as light sources 134; however, it is contemplated that the light sources 134 may include tens, hundreds, and/or thousands of light sources 134.

In some examples, LEDs may be used as the individual light sources 134. The LEDs may have a diameter ranging from 10 to 50 microns and a height ranging from 5 to 20 microns. In some examples, the LEDs have a maximum width or length, whichever is longer, ranging from about 300 to 320 microns. In some examples, the individual light sources 134 (e.g., LEDs) have a diameter ranging from about 20 to 30 microns and a height ranging from about 5 to 50 microns. In some examples, the LEDs have dimensions ranging from 230 to 300 microns on one side, 180 to 200 microns on a second side, and 50 to 80 microns in height. Therefore, examples provided herein that include measurements referencing a thickness with respect to one or more light sources 134 may be within 80 microns of the distance stated since the thickness of the light sources 134 is determined by the thickness of the substrate (where thickness of the light sources 134 is a measure of the height of the profile of the light sources 134 or, equivalently, a measure of the distance from the surface of the outermost layer of the substrate to the side of the light sources 134 disposed away from the outermost layer of the substrate). It will be appreciated, however, that any measurements provided herein are non-limiting examples. Any light sources 134 provided within the light-producing assembly 132 may be configured in any desired manner and within any distance of any other light sources 134 without departing from the teachings provided herein.

Furthermore, because the maximum width of unpackaged LEDs, which may be utilized as the light sources 134 of the currently described light-producing assembly 132, is less than that of standard packaged LEDs, space between the centers of each LED may be reduced, which therefore increases the uniformity of the perceived light. In some examples, the space between the centers of each unpackaged LED after being deposited is 0.05 millimeters. Since LEDs produce a "point" of light and because it is desirable in many applications to have uniform light (i.e., not being able to distinguish each point of light), as a rule of thumb, the diffusing offset distance (i.e., the minimum distance at which the light emitted from an LED array is perceived as uniform) may be approximately equal to the distance between the centers of adjacent LEDs. Therefore, for an LED light source 134, the diffusing offset distance may have a diffusing offset distance of approximately 0.05 millimeters.

It will be understood that the light-producing assembly 132 may incorporate a single continuous light source 134 and/or a plurality of individual light sources 134. In examples where there is a plurality of light sources 134, some or all of the light sources 134 may be independently electrically connected (e.g., through a conductive ink). In independently electrically connected examples of the light sources 134, each of the light sources 134 may be independently addressable, which may allow a controller 136 (FIG. 7) to create static and dynamic patterns of light by independently illuminating certain light sources 134 and not others. In some instances, a machine may function to transfer unpackaged light sources 134 from a substrate such as a "wafer tape" to a product substrate, such as a circuit substrate. The direct transfer of unpackaged light sources 134 may reduce the thickness of an end product compared to a similar product produced by conventional means, as well as the amount of time and/or cost to manufacture the product substrate. Additional information on the formation of the plurality of light sources 134 and/or variously configured light-producing assemblies is disclosed in U.S. Patent Publication No. 2015/0136573 to Peterson et al. and U.S. Patent Publication No. 2016/0276205 to Huska et al., both of which are incorporated herein by reference.

Figure 7:
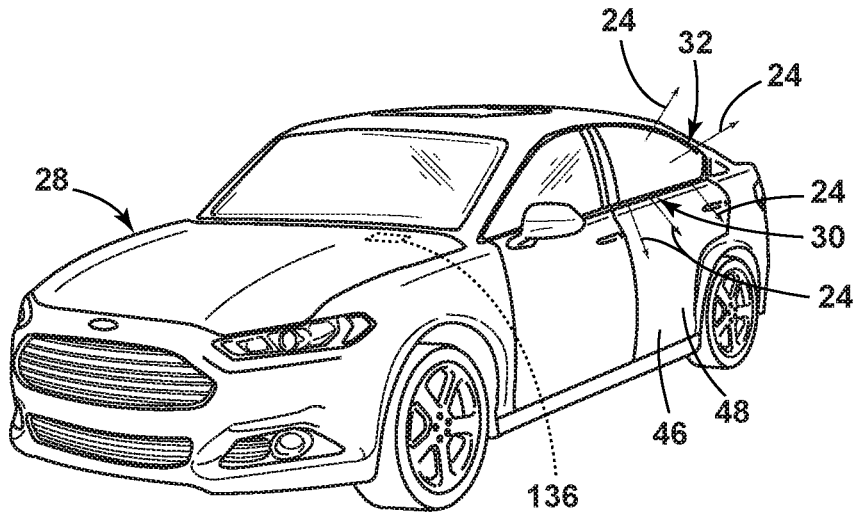
FIG. 7 is a front perspective view of the vehicle having the illumination assembly emanating light of a first wavelength.
Figure 8:
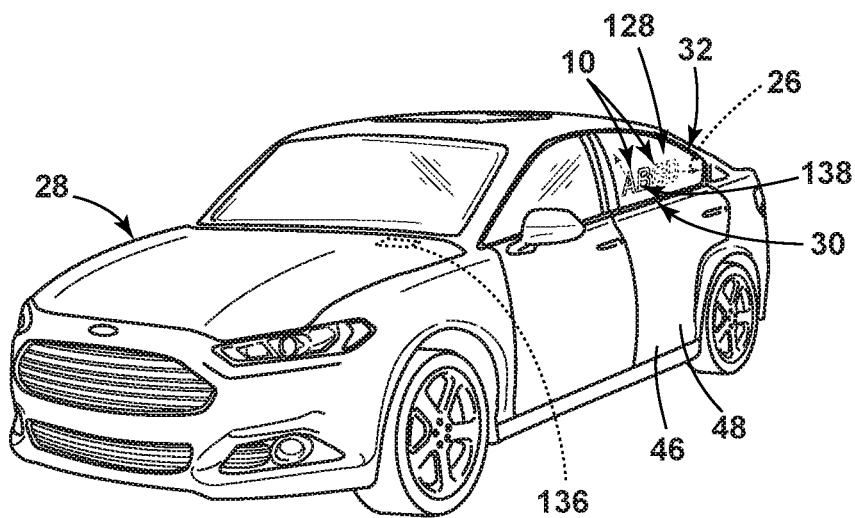
FIG. 8 is a front perspective view of the vehicle having the illumination assembly emanating light of a second wavelength.
Figure 9:
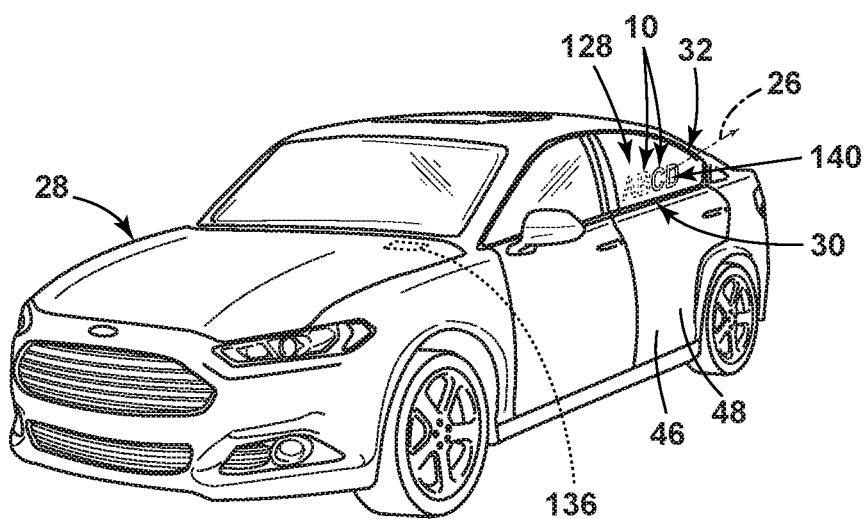
FIG. 9 is a front perspective view of the vehicle having the illumination assembly emanating light of a third wavelength.

Referring to FIGS. 7-9, the indicia 128 is in the form of one or more letters on the rear window 32 and may be defined by the luminescent structure 10 that is visible in a luminescent state. The indicia 128 may be used to provide any desired notification, such as when the vehicle 28 is being used for commercial purposes and/or while an associated application 58 is operating on an occupant's electronic device 56. For example, when a vehicle occupant initiates the application 58, some, or all, of the indicia 128 may luminesce in response to initiation of the application 58 and/or in response to a chosen state, feature, task, job, or setting within the application 58. It will be appreciated, however, that the indicia 128 may additionally, or alternatively, form turn signals, insignia indicating a vehicle manufacturer, a user defined message, an image, a trademark, and/or any other desired information. Moreover, the one or more light sources 40 may emit a plurality of wavelengths of excitation light 24 that excite unique luminescent structures 10 such that more than one set of indicia 128 may independently luminesce. For example, a first set of indicia 138 (FIG. 8) may be illuminated in a first state and a second set of indicia 140 (FIG. 9) may be independently illuminated in a second state.

With further reference to FIGS. 7-9, in some examples, the one or more light sources may illuminate a portion of the vehicle 28, a portion of a ground surface proximate the vehicle 28, and/or a window 32 of the vehicle 28 in response to a wide variety of parameters. For example, the window 32 may illuminate to indicate a locked or unlocked state of the vehicle 28. Additionally, the illumination may arise as part of a welcome/farewell sequence that is initiated as an occupant approaches and/or exits the vehicle 28. The illumination may also be activated as a notification to an occupant of the vehicle 28 that the vehicle 28 needs attention in some manner, such as when a vehicle tire is below a set minimum, the vehicle 28 is nearly empty of fuel, etc. It will be appreciated that the illuminated seal assembly 30 may be activated and deactivated for any purpose without departing from the scope of the present disclosure.

Since lighting conditions may vary depending on a plurality of factors including, but not limited to, the current time, date, and weather conditions, the intensity of excitation light 24 emitted from the one or more light sources 40 may be adjusted by a controller 136 within the vehicle 28 such that illumination of the luminescent structure 10 may be noticed under any condition. For example, the light intensity in Florida during a clear summer afternoon will generally be higher than the light intensity in Michigan during an overcast winter morning. Thus, by making this type of information known to the controller 136, the controller 136 can adjust any one or more light sources 40.

According to various examples, the luminescent structure 10 discussed herein is substantially Lambertian, that is, the apparent brightness of the luminescent structure 10 is substantially constant regardless of an observer's angle of view. As described herein, the color of the converted light 26 may be significantly dependent on the particular luminescent materials 18 utilized in the luminescent structure 10. Additionally, a conversion capacity of the luminescent structure 10 may be dependent on a concentration of the luminescent material 18 utilized in the luminescent structure 10. By adjusting the range of intensities that may excite the luminescent structure 10, the concentration, types, and proportions of the luminescent materials 18 in the luminescent structure 10 discussed herein may be operable to generate a range of color hues of the excitation light 24 by blending the first wavelength with the second wavelength.

Use of the present disclosure may offer a variety of advantages. For instance, use of the illuminated seal assembly may provide unique lighting to the vehicle. For example, the illuminated seal assembly may provide lighting through a window of the vehicle, through a trim member of the vehicle, along a panel of the vehicle, and/or to a ground surface proximate the vehicle. The lighting may be used to notify a user of the vehicle of a vehicle condition. The illuminated seal assembly may include any or all of the features provided herein and still is manufactured at low costs when compared to standard illuminated seal assemblies and lighting assemblies.

According to various examples, an illuminated seal assembly is provided herein. The illuminated seal assembly includes a carrier that is configured to attach to a vehicle. The carrier has a first region and a second region having varied light transmissivities. A first light source is disposed on the carrier. A light guide is operably coupled with the first light source. The seal assembly may be configured as a vehicle seal assembly. Examples of the seal assembly can include any one or a combination of the following features:

- a second light source, wherein the first light source emits light along the light guide and the second light source emits light towards a vehicle window;
- a first leaf on the carrier, the first leaf configured to abut a vehicle window;
- a second leaf on the carrier, the second leaf configured to retain a trim member;
- the first region is disposed inboard of a second leaf and the second region is disposed outboard of the second leaf;
- a trim member attached to the carrier;
- a luminescent structure disposed on the trim member, the luminescent structure configured to luminesce in response to receiving excitation light;
- a reflective material disposed on an interior surface of the light guide;
- a luminescent structure disposed on a vehicle window and configured to luminesce in response to receiving excitation light from the first light source;
- the luminescent structure is not readily visible when the luminescent structure is in a non-luminescent state;
- the first leaf includes a plurality of fibers thereon;
- the window includes a light-directing member for accepting and transmitting the excitation light through the window; and/or the light source is configured to emit light in an outboard direction and an inboard direction.

Moreover, a method of illuminated a vehicle is provided herein. The method includes forming a carrier that is configured to attach to a vehicle. The carrier has a first region and a second region having varied light transmissivities. A first light source is disposed on the carrier. A light guide is operably coupled with the first light source.

According to some examples, a vehicle includes a flange formed by a panel of the vehicle. A window is defined within the panel. An illuminated seal assembly is coupled with the flange. A light source configured to emit light in an outboard direction and an inboard direction from within the seal assembly. Examples of the vehicle can include any one or a combination of the following features:

the light emitted in the inboard direction is transmitted through the window; and/or the light emitted in the outboard direction is transmitted along the panel.

According to other examples, an illuminated seal assembly for a vehicle includes a carrier having a first region and a second region having varied light transmissivities. The first region is inboard of the second region. A first light source is disposed on the carrier. A light guide is operably coupled with the first light source. Examples of the seal assembly can include any one or a combination of the following features:

a second light source, wherein the first light source emits light along the light guide and the second light source emits light towards a vehicle window;

a first leaf on the carrier, the first leaf configured to abut a vehicle window;

a second leaf on the carrier, the second leaf configured to retain a trim member; and/or the vehicle window includes a luminescent structure thereon and the second light source excites the luminescent structure.

It will be understood by one having ordinary skill in the art that construction of the described invention and other components is not limited to any specific material. Other exemplary examples of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. An illuminated seal assembly comprising:
a carrier that is configured to attach to a vehicle, the carrier having a first region and a second region having varied light transmissivities;
a first light source disposed on the carrier; and
a light guide operably coupled with the first light source.

2. The illuminated seal assembly of claim 1, further comprising:
a second light source, wherein the first light source emits light along the light guide and the second light source emits light towards a vehicle window.

3. The illuminated seal assembly of claim 1, further comprising:
a first leaf on the carrier, the first leaf configured to abut a vehicle window.

4. The illuminated seal assembly of claim 3, further comprising:
a second leaf on the carrier, the second leaf configured to retain a trim member.

5. The illuminated seal assembly of claim 3, wherein the first leaf includes a plurality of fibers thereon.

6. The illuminated seal assembly of claim 1, further comprising:
a trim member attached to the carrier.

7. The illuminated seal assembly of claim 6, further comprising:
a luminescent structure disposed on the trim member, the luminescent structure configured to luminesce in response to receiving excitation light.

8. The illuminated seal assembly of claim 1, further comprising:
a reflective material disposed on an interior surface of the light guide.

9. The illuminated seal assembly of claim 1, further comprising:
a luminescent structure disposed on a vehicle window and configured to luminesce in response to receiving excitation light from the first light source.

10. The illuminated seal assembly of claim 9, wherein the luminescent structure is not readily visible when the luminescent structure is in a non-luminescent state.

11. The illuminated seal assembly of claim 9, wherein the window includes a light-directing member for accepting and transmitting the excitation light through the window.

12. The illuminated seal assembly for a vehicle of claim 1, further comprising:
a second light source, wherein the first light source emits light along the light guide and the second light source emits light towards a vehicle window.

13. The illuminated seal assembly for a vehicle of claim 12, wherein the vehicle window includes a luminescent structure thereon and the second light source excites the luminescent structure.

14. The illuminated seal assembly for a vehicle of claim 1, further comprising:
a first leaf on the carrier, the first leaf configured to abut a vehicle window.

15. The illuminated seal assembly for a vehicle of claim 14, further comprising:
a second leaf on the carrier, the second leaf configured to retain a trim member.

16. The illuminated seal assembly of claim 1, wherein the first region is disposed inboard of a second leaf and the second region is disposed outboard of the second leaf.

17. A vehicle comprising:
a flange formed by a panel of the vehicle;
a window defined within the panel;
an illuminated seal assembly coupled with the flange; and
a light source configured to emit light in an outboard direction and an inboard direction from within the seal assembly.

18. The vehicle of claim 17, wherein the light emitted in the inboard direction is transmitted through the window.

19. The vehicle of claim 17, wherein the light emitted in the outboard direction is transmitted along the panel.

20. An illuminated seal assembly for a vehicle comprising:
a carrier having a first region and a second region having varied light transmissivities, wherein the first region is inboard of the second region;
a first light source disposed on the carrier; and
a light guide operably coupled with the first light source.

* * * * *